(12) United States Patent
Tsotsis (10) Patent No.: US 11,097,495 B2
(45) Date of Patent: Aug. 24, 2021

(54) COMPOSITE STRUCTURES AND METHODS FOR MANUFACTURING COMPOSITE STRUCTURES

(71) Applicant: The Boeing Company, Chicago, IL (US)

(72) Inventor: Thomas K. Tsotsis, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 16/660,923

(22) Filed: Oct. 23, 2019

(65) Prior Publication Data

US 2021/0122124 A1  Apr. 29, 2021

(51) Int. Cl.
| | | |
|---|---|---|
| *B29C 41/00* | (2006.01) | |
| *B64F 5/00* | (2017.01) | |
| *B29D 99/00* | (2010.01) | |
| *B29C 65/00* | (2006.01) | |
| *B64F 5/10* | (2017.01) | |
| *B29C 41/08* | (2006.01) | |
| *B29L 31/30* | (2006.01) | |
| *B64C 1/06* | (2006.01) | |

(52) U.S. Cl.
CPC ........ *B29C 66/43441* (2013.01); *B29C 41/08* (2013.01); *B29C 66/474* (2013.01); *B29D 99/0003* (2013.01); *B64F 5/10* (2017.01); *B29L 2031/3076* (2013.01); *B64C 1/061* (2013.01); *B64C 1/066* (2013.01)

(58) Field of Classification Search
CPC ......... B29C 41/00; B29C 41/08; B29C 66/00; B29C 66/40; B29C 66/43; B29C 66/434; B29C 66/4344; B29C 66/4341; B29C 66/47; B29C 66/474; B64F 5/00; B64F 5/10; B29D 99/00; B29D 99/0003
See application file for complete search history.

(56) References Cited

U.S. PATENT DOCUMENTS

| | | | | |
|---|---|---|---|---|
| 5,028,478 | A | * | 7/1991 | Odagiri ............... C08J 5/24 442/248 |
| 5,413,847 | A | * | 5/1995 | Kishi ............... B29C 70/025 442/69 |
| 7,435,693 | B2 | | 10/2008 | Tsotsis et al. |
| 8,246,882 | B2 | | 8/2012 | Tsotsis |
| 8,361,262 | B2 | | 1/2013 | Tsotsis et al. |
| 8,372,231 | B1 | | 2/2013 | Tsotsis |
| 8,607,835 | B2 | | 12/2013 | Tsotsis |
| 9,415,577 | B1 | | 8/2016 | Sutkus et al. |
| 2017/0182738 | A1 | * | 6/2017 | Griess ............... B32B 5/26 |

* cited by examiner

*Primary Examiner* — Jacob T Minskey
*Assistant Examiner* — Matthew Hoover
(74) *Attorney, Agent, or Firm* — Walters & Wasylyna LLC (57) ABSTRACT

A method for manufacturing a composite structure. The method includes depositing a plurality of thermoplastic particles onto at least one of a surface of a filler member and a surface of a structural member. The method further includes assembling the filler member with the structural member such that the plurality of thermoplastic particles are disposed proximate an interface between the filler member and the structural member.

21 Claims, 11 Drawing Sheets

COMPOSITE STRUCTURES AND METHODS FOR MANUFACTURING COMPOSITE STRUCTURES

FIELD

This application relates to composite structures with filler members, such as radius fillers, and, more particularly, to methods for manufacturing composite structures that yield toughened filler member-to-surrounding structure interfaces.

BACKGROUND

Composite structures are often formed as assemblies of two or more discrete pieces. In joining these pieces, and thereby forming the composite structure, voids (e.g. cavities) may be defined in the spaces where the pieces do not meet. These voids are typically filled in order to maximize the strength and/or rigidity of the composite structure. In order to fill a void and strengthen the composite structure, a pre-formed filler member, such as a radius filler, is placed in the void and co-cured/co-bonded to the composite structure.

Despite advances already made, those skilled in the art continue with research and development efforts in the field of composite structure manufacturing.

SUMMARY

In one example, the disclosed method for manufacturing a composite structure includes depositing a plurality of thermoplastic particles onto at least one of a surface of a filler member and a surface of a structural member. The method further includes assembling the filler member with the structural member such that the plurality of thermoplastic particles are disposed proximate an interface between the filler member and the structural member.

In one example, the disclosed method for manufacturing a composite structure includes depositing a plurality of thermoplastic particles onto a surface of a filler member and assembling the filler member with a structural member such that the plurality of thermoplastic particles are disposed proximate an interface between the filler member and the structural member.

In another example, the disclosed method for toughening an interface between a filler member and a structural member includes depositing a plurality of thermoplastic particles onto a surface of the filler member and incorporating the filler member into a preform that includes the structural member and the filler member such that the plurality of thermoplastic particles are disposed proximate the interface. The method further includes infusing the preform with a thermoset resin and curing the thermoset resin.

In yet another example, the disclosed composite structure includes a first structural member that includes reinforcing fibers and thermoset resin, and a second structural member connected to the first structural member. The second structural member includes reinforcing fibers and thermoset resin, wherein the first structural member and the second structural member define a void. The composite structure also includes a filler member positioned in the void, the filler member includes reinforcing fibers and thermoset resin, wherein the filler member is connected to the first structural member at a first interface, and wherein the filler member is connected to the second structural member at a second interface. The composite structure further includes a plurality of thermoplastic particles proximate at least one of the first interface and the second interface.

Other examples of the disclosed composite structures and associated methods will become apparent from the following detailed description, the accompanying drawings and the appended claims.

DETAILED DESCRIPTION

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

Figure 1:
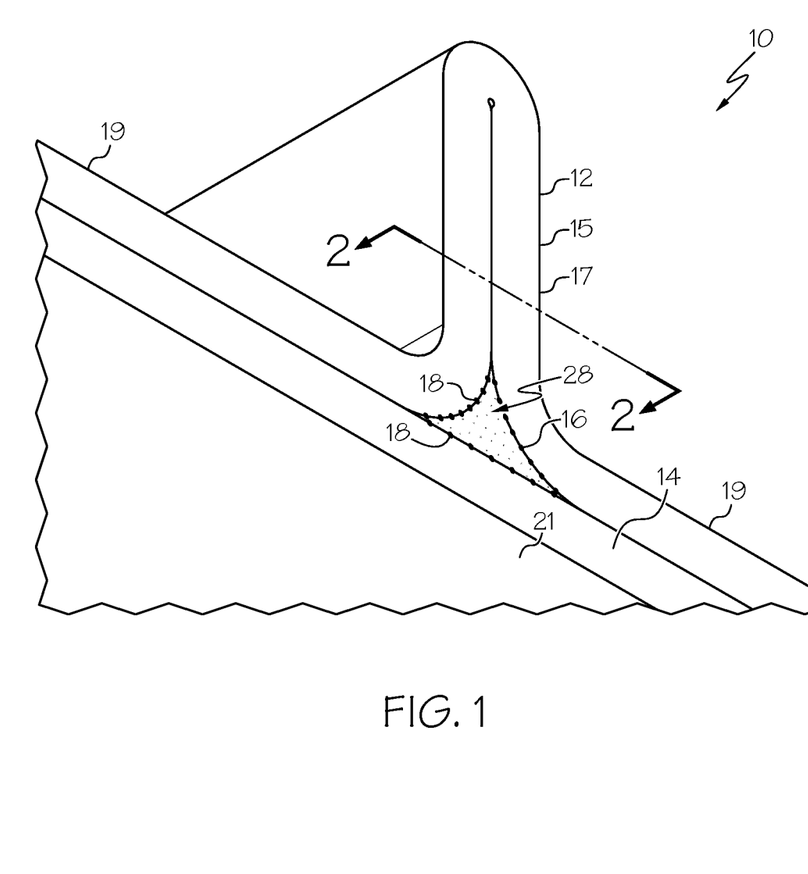
FIG. 1 is a front perspective view of one example of the disclosed composite structure with a toughened filler member-to-surrounding structure interface.
Figure 2:
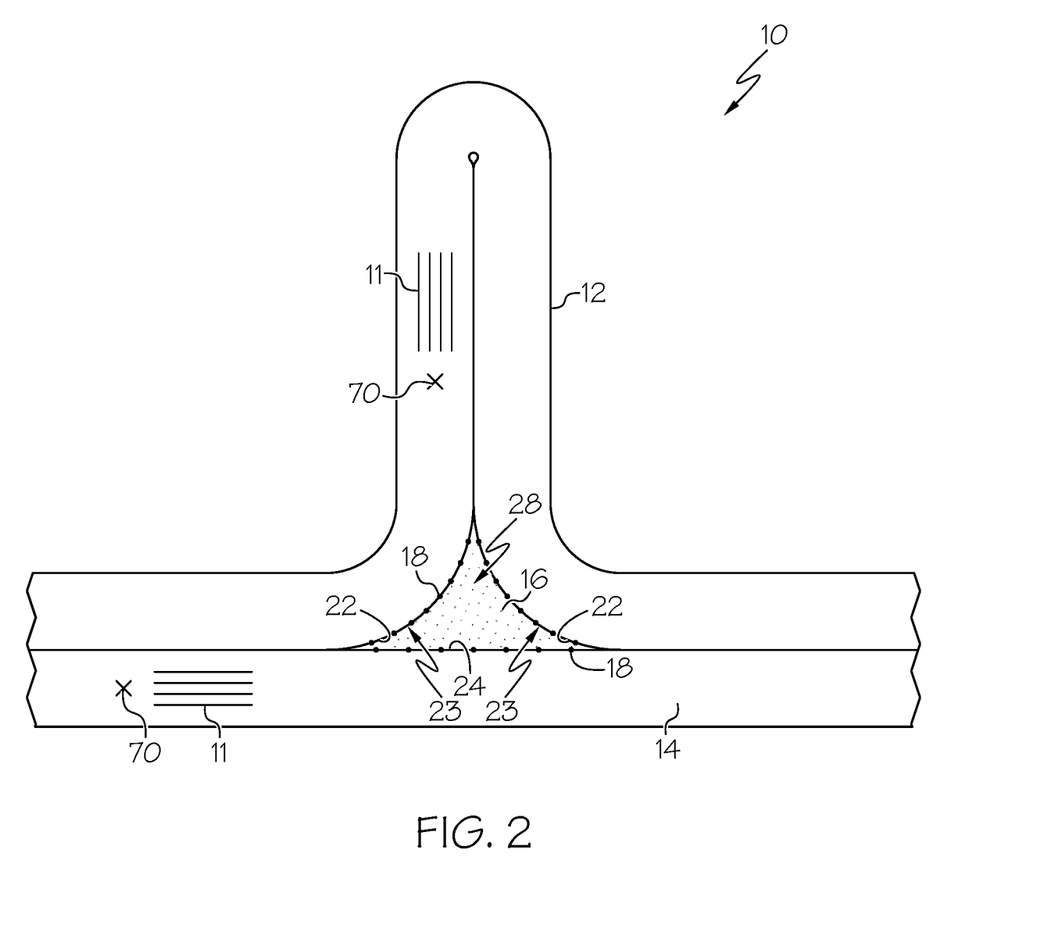
FIG. 2 is a front elevational view of the composite structure of FIG. 1.

Referring to FIGS. 1 and 2, the present disclosure provides non-limiting examples of a composite structure 10 that includes a first structural member 12, a second structural member 14 and a filler member 16 positioned between the first structural member 12 and the second structural member 14. The first structural member 12 and the second structural member 14 each defines an interface (e.g., a first interface 22 and a second interface 24) with the filler member 16.

Proximate (at or near) at least one of the first interface 22 and the second interface 24 is a plurality of thermoplastic particles 18 deposited onto the filler member 16 to toughen (e.g., reinforce) the interface(s) 22, 24.

In one example, at least one of the first and second structural members 12, 14 may be formed out of plies of composite material. These plies may be laid flat and assembled into a layup, which may then be formed into a final desired shape (e.g., the first and second structural members 12, 14). In doing so, the plies that were originally laid flat may be required to form (e.g., have a local change in geometry such as a change in radius, having to form over another structural element, having a multiple change in curvature, such as a joggle, etc.) in accordance with the design specifications related to the final desired shape. The changes in local geometry thereby result in the presence of radii 23 in the first and/or second structural members 12, 14. The sizes of the radii 23 may depend upon the thicknesses of the first and second structural members 12, 14 and the number of plies in the first and second structural members 12, 14, among other possible factors. Due to these radii 23, there may be discrete regions within the composite structure 10 where the first and second structural members 12, 14 do not meet, thereby defining voids 28. Accordingly, those skilled in the art will appreciate that the size, shape, and number of voids 28 depends on the design of the first and second structural members 12, 14.

As illustrated, the first structural member 12 may be a stringer 15 (more specifically, a blade stringer) and the second structural member 14 may be the skin 21 of a vehicle, such as the skin 21 of an aircraft 1002. Those skilled in the art will appreciate, however, that the composite structure 10 may be employed in various applications, including those beyond aerospace, and, as such, may vary in terms of size, shape and function without departing from the scope of the present disclosure.

The first structural member 12 and the second structural member 14 may be constructed out of any suitable material so long as the resulting first and second structural members 12, 14 are connectable to a filler member 16, with a plurality of thermoplastic particles 18 proximate the interfaces 22, 24 therebetween. The plurality of thermoplastic particles 18 may become part of the interfaces 22, 24. In one example, a composite structure 10 that was manufactured for aerospace applications may include a first structural member 12 and second structural member 14, wherein at least one of the first and second structural members 12, 14 includes reinforcing fibers 11 embedded in a resin matrix 70, such as a thermoset resin. In another example, the composite structure may include a first structural member 12 and second structural member 14 wherein at least one of the first and second structural members 12, 14 includes carbon fibers embedded in an epoxy resin. In yet another example, at least one of the first and second structural members 12, 14 includes thermoplastic materials. Those skilled in the art will appreciate that various other reinforcing fibers 11, resin matrices, and combinations thereof may be employed without departing from the scope of the present disclosure.

Whether due to deliberate design choices or manufacturing limitations, among other reasons, assembled composite structures 10 may often include one or more voids 28 (e.g., cavities). For example, as shown in FIGS. 1 and 2, the composite structure 10 may include a first structural member 12 that includes a web portion 17, a perpendicularly aligned flange portion 19, and radius 23 connecting the web portion 17 to the flange portion 19. The composite structure 10 may further include a second structural member 14 connected to the flange portion 19 of the first structural member 12. Due to the radius 23 of the first structural member 12 and the relatively planar shape of the second structural member 14, a void 28 is defined between the first and second structural members 12, 14 adjacent the radius 23. Those skilled in the art will appreciate that the size and shape of the void 28 depends on the size and shape of the first and second structural members 12, 14, the thicknesses of the first and second structural members 12, 14, the number of plies in the first and second structural members 12, 14, and the sizes of the radii 23. Thus, the size and shape of the void 28 may vary in accordance with the design of the first and second structural members 12, 14.

A filler member 16 may be positioned within the void 28 to stiffen the composite structure 10. As such, it is generally contemplated that the filler member 16 should be constructed out of a material (or materials) capable of imparting a degree of rigidity to the overall composite structure 10. In one example, like the first and second structural members 12, 14, the filler member 16 may include reinforcing fibers 11 embedded in a resin matrix 70, such as a thermoset resin. In another example, the filler member 16 may include carbon fibers embedded in an epoxy resin. In yet another example, the filler member 16 may be constructed entirely out of different materials than those used to construct the first and second structural members 12, 14.

Once positioned within the void 28, the filler member 16 may be connected to the first structural member 12 at a first interface 22 and to the second structural member 14 at a second interface 24. In one or more examples, there may also be additional composite structure components (such as additional structural members) and even external components (e.g., not a part of the composite structure) connected to the filler member 16 with interfaces defined therebetween.

Although the filler member 16 is generally depicted in FIGS. 1 and 2 as being relatively triangular in cross-section (e.g., having one linear edge and two concave edges), those skilled in the art will appreciate that the size and shape of the filler member 16 largely depends on the size and shape of the void 28, as well as the number of changes in local geometry along the filler length, the thickness being bent, and the radii associated with local geometry changes. A filler member 16 that substantially fills the void 28 will have the same size and shape as the void 28. A filler member 16 that does not substantially fill the void 28, and thus, may be smaller and constructed in a variety of regular and irregular shapes, may still be constrained by the physical dimensions of the void 28. Further, filler members 16 that do not substantially fill the void 28 may thereby allow for the positioning of additional filler members 16 (not shown) within the void 28.

Figure 3A:
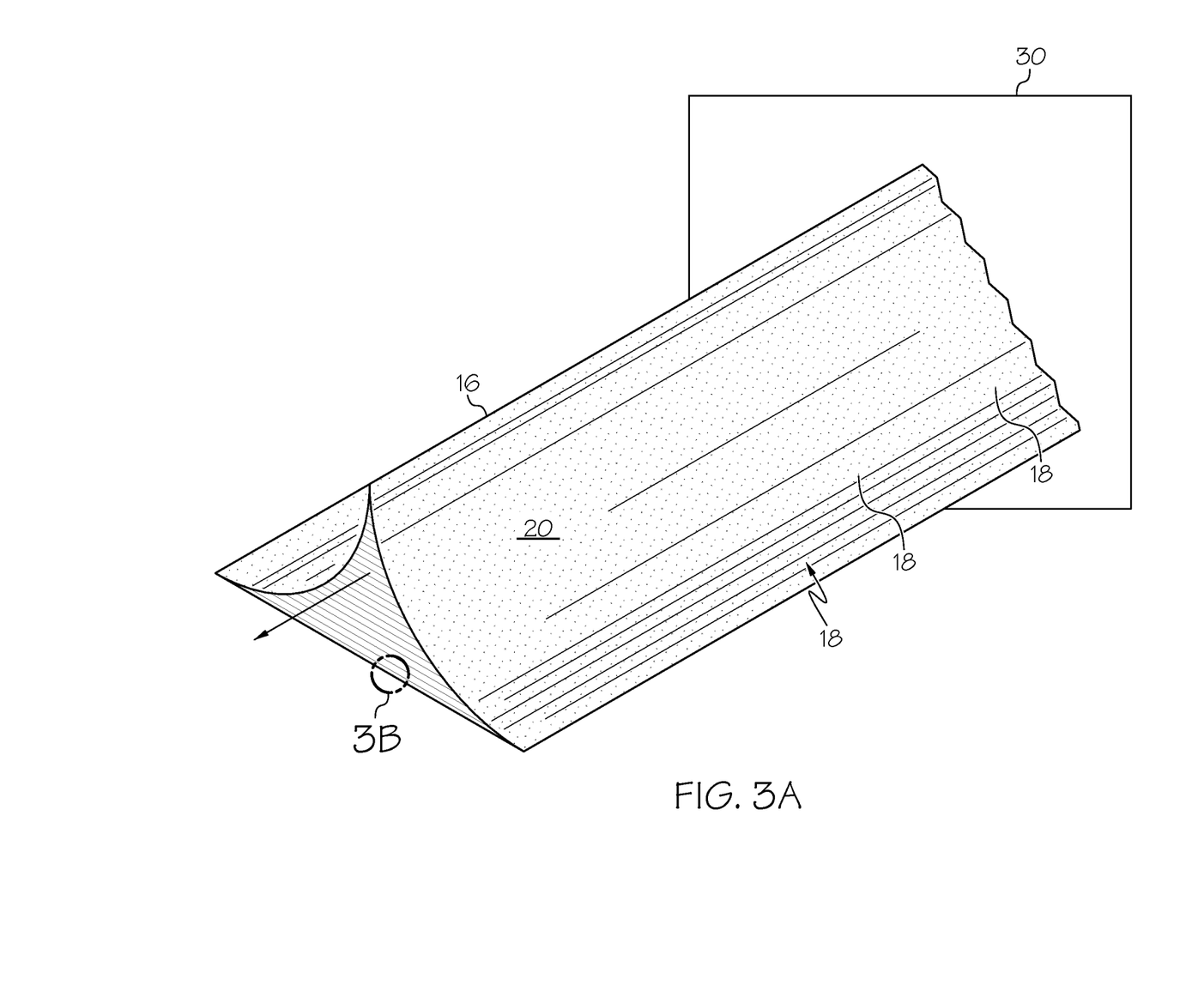
FIG. 3A is a front perspective view of a filler member passing through a coating station and receiving a coating of thermoplastic particles in accordance with the present disclosure.

Referring to FIG. 3A, a plurality of thermoplastic particles 18 are deposited onto a surface 20 of the filler member 16 such that the plurality of thermoplastic particles 18 are disposed proximate (at or near) at least one of the first interface 22 and the second interface 24. Without being limited to any particular theory, the presence of thermoplastic particles 18 at the first interface 22 and the second interface 24 is believed to enhance toughness at the first interface 22 and the second interface 24. Those skilled in the art will appreciate that "toughness" refers to the amount of energy required to grow a unit of crack area/extension. Therefore, a composite structure 10 having thermoplastic particles 18 at one or more interfaces 22, 24 between structural members 12, 14 and filler members 16 will be capable of absorbing more energy than similar a composite structure without thermoplastic particles 18 at the interfaces 22, 24.

The plurality of thermoplastic particles 18 may be formed from any suitable thermoplastic material 40. For example, the thermoplastic material 40 may include a member selected from a group consisting of polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, polyethylene terephthalate, and combinations thereof. Those skilled in the art will appreciate that other thermoplastic materials 40 and combinations thereof may be employed without departing from the scope of the present disclosure.

Depending on which thermoplastic material(s) 40 were selected and the processing conditions related to deposition of those thermoplastic material(s) 40 onto the filler member 16, the thermoplastic particles 18 may vary in size (as measured by the maximum transverse dimension of the thermoplastic particle 18 after having been deposited). Thus, the size of the thermoplastic particles 18 is yet another design variable that may be predetermined and/or changed as needed. In one example, the plurality of thermoplastic particles 18 may have an average particle size (e.g., a diameter for spherical particles or a maximum transverse dimension of non-spherical particles) between about 1 micrometer and about 100 micrometers. In another example, the plurality of thermoplastic particles 18 may have an average particle size between about 10 micrometers and about 50 micrometers. In yet another example, the plurality of thermoplastic particles 18 may have an average particle size between about 23 micrometers and about 30 micrometers. Those skilled in the art will appreciate that pluralities of thermoplastic particles 18 having other average particle sizes may be employed without departing from the scope of the present disclosure.

After having been deposited, the plurality of thermoplastic particles 18 may be present at an areal density (mass per unit area) across the filler member 16. The areal density is a function of the distribution of thermoplastic particles 18 across the filler member 16 and the number of thermoplastic particles 18 deposited. For example, the plurality of thermoplastic particles 18 may be present at an areal density of about 1 g/m$^2$ to about 10 g/m$^2$ across the filler member 16. In another example, the plurality of thermoplastic particles 18 may be present at an areal density of about 2 g/m$^2$ to about 8 g/m$^2$ across the filler member 16. In yet another example, the plurality of thermoplastic particles 18 may be present at an areal density of about 3 g/m$^2$ to about 6 g/m$^2$ across the filler member 16. Further, the areal weight of the particles may be specified by the number of particles per unit area such that smaller particles at a lower areal weight may impart an equivalent toughness improvement as a higher areal weight of larger particles if the number of particles per unit area is roughly the same.

At this point, those skilled in the art will appreciate that relatively high areal densities correspond to a greater number of thermoplastic particles 18 per unit area and, thus, greater toughness at the interfaces 22, 24. However, as the areal density of thermoplastic particles 18 at an interface 22, 24 becomes too high, there may be no further increase in toughness. Furthermore, as the areal density of thermoplastic particles 18 at an interface 22, 24 becomes too high, the thermoplastic particles 18 may serve as a barrier that inhibits (if not outright prevents) infusion (see Block 150 of FIG. 8) of resin matrix 70 (FIG. 2) into the filler member 16 and/or the structural members 12, 14.

Although the plurality of thermoplastic particles 18 are shown as being uniformly distributed across the filler member 16, in some applications, a non-uniform distribution of the thermoplastic particles 18 of the filler member 16 may be desired. In one example, it may be desirable to deposit a higher concentration of thermoplastic particles 18 on some portions of the filler member 16 and a lower concentration of thermoplastic particles 18 on other portions of the filler member 16. For example, if a portion of the filler member 16 corresponds to a portion of a structural member 12, 14 that receives higher energy input, it may be desirable to deposit a greater concentration of thermoplastic particles 18 on that portion of the filler member 16. The areal density of thermoplastic particles 18 at that portion of the filler member 16 would be relatively high compared to other portions of the filler member 16. Increasing the concentration of thermoplastic particles 18 on a particular portion of the filler member 16 may be achieved by depositing a greater quantity of thermoplastic particles 18 at that portion of the filler member 16 and/or by tightening the distribution of thermoplastic particles 18.

Figure 3B:
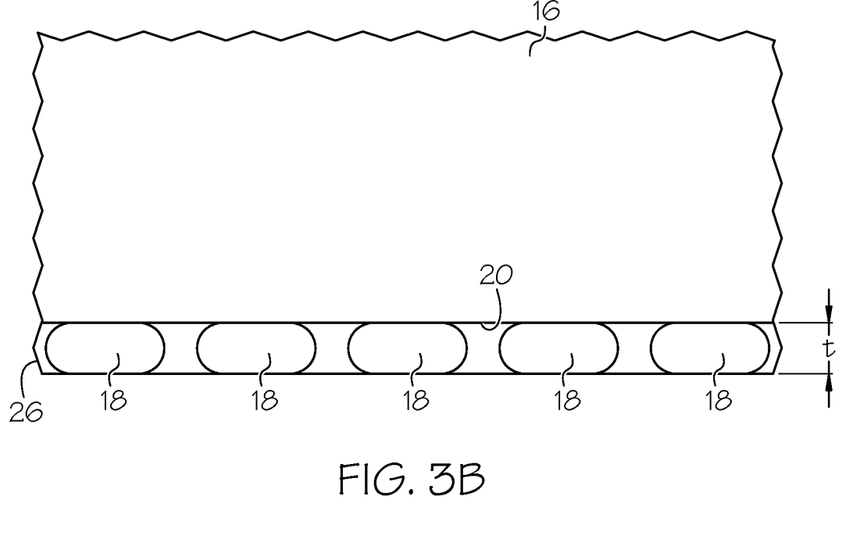
FIG. 3B is a detailed view of a portion of the filler member of FIG. 3A.

After having been deposited, the plurality of thermoplastic particles 18 may define a coating layer 26 on the filler member 16. This coating layer 26 may be discontinuous (e.g., portions of the filler member 16 remain uncovered by a thermoplastic particle 18) (FIG. 3B). Further, this coating layer 26 may define a coating thickness (t) measured perpendicular to a surface 20 of the filler member 16. In one example, the coating layer 26 may have a coating thickness (t) ranging from about 1 micrometer and about 100 micrometers. In another example, the coating layer 26 may have a coating thickness (t) ranging from about 2 micrometer and about 80 micrometers. In yet another example, the coating layer 26 may have a coating thickness (t) ranging from about 3 micrometer and about 60 micrometers.

Figure 8:
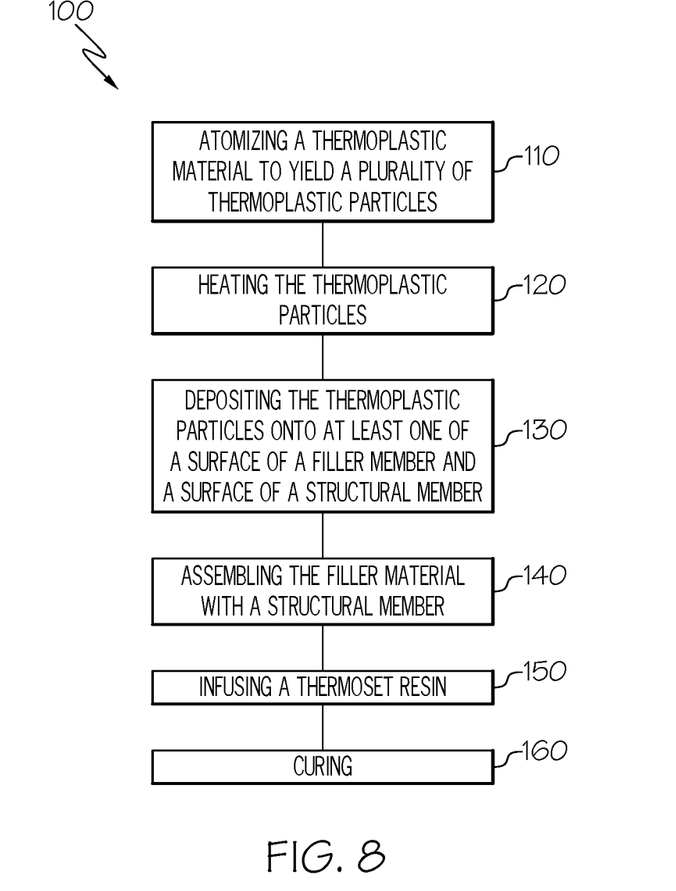
FIG. 8 is a flow diagram depicting one example of the disclosed method for manufacturing a composite structure.

Referring to FIG. 8, the present disclosure provides examples of a method 100 for manufacturing a composite structure 10. The disclosed method 100 may yield various composite structures having different sizes, shapes and functions. For example, the method 100 may be employed to manufacture a portion of an aircraft 1002, like the composite structure 10 disclosed above. The method 100 includes depositing (block 130) a plurality of thermoplastic particles 18 onto a surface 20 of a filler member 16 and assembling (block 140) the filler member 16 with a structural member 12 such that the plurality of thermoplastic particles 18 is disposed proximate an interface 22 between the filler member 16 and the structural member 12.

The material composition of either the filler member 16 and/or the structural member 12 may vary without departing from the scope of the present disclosure. Suitable materials may be selected with consideration given to the conditions and requirements related to the end use of the composite structure 10 (which includes the filler member 16 and the structural member 12). In aerospace applications, it may be preferable to select a filler member 16 and/or a structural member 12 constructed out of reinforcing fibers 11 embedded in a resin matrix 70. In one example, the reinforcing fibers 11 may include carbon fibers. In another example, the resin matrix 70 may include a thermoset resin. In yet another example, the resin matrix 70 may include an epoxy resin. Those skilled in the art will appreciate that filler members 16 and structural members 12 constructed out of various other materials may be employed without departing from the scope of the present disclosure.

Further, for reasons discussed below, it may be preferable to select filler members 16 and/or structural members 12 that contain reinforcing fibers 11 but no resin matrix 70 (sometimes referred to as being "dry"). In these cases, the resin matrix 70 may be infused into the filler member 16 and/or the structural member 12 in later stages of the manufacturing process.

Alternatively, in one or more examples, the method may be performed using filler members 16 and/or structural members 12 that already include resin matrix 70 (e.g., pre-impregnated). These filler members 16 and/or structural members 12 may be preferred, for example, in applications where the assembling 140 of the composite structure 10 is particularly difficult. In these cases, the resin matrix 70 may act as a binder to hold the reinforcing fibers 11 together as the composite structure 10 is being assembled.

Additionally, in one or more examples, at least one of the first structural member 12 and the second structural member 14 may be fabricated from pre-impregnated material, and the filler member 16 may include only reinforcing fibers (e.g., "dry"). In this case, the plurality of thermoplastic particles 18 may be deposited onto the dry filler member 16, which may then be infused with resin matrix 70 in later stages of the manufacturing process.

The method 100 may begin by atomizing (block 110) (e.g., converting into very fine particles or droplets) a thermoplastic material 40 to yield a plurality of thermoplastic particles 18. Those skilled in the art will appreciate that atomizing 110 the thermoplastic material 40 may produce fine, relatively spherical thermoplastic particles 18. As such, atomizing 110 the thermoplastic material 40 may be preferred in applications where particularly small particle sizes are desired, and atomizers may be selected based on its ability to produce thermoplastic particles 18 of that desired size. Atomizing 110 the thermoplastic material 40 prior to depositing 130 may also provide the additional benefit of enabling a more uniform distribution of thermoplastic particles 18 across the filler member 16.

The thermoplastic material 40 may be any suitable thermoplastic material 40, including a member selected from a group consisting of polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyetheretherketone, polyarylamide, polyketone, polyphthalamide, polyphenylenether, polybutylene terephthalate, polyethylene terephthalate, and combinations thereof. Those skilled in the art will appreciate that other suitable thermoplastic materials 40 may be employed in the disclosed method without departing from the scope of the present disclosure.

The method 100 may also include heating (block 120) the thermoplastic particles 18 prior to being deposited. Heating 120 the thermoplastic particles 18 may facilitate the deposition of the thermoplastic particles 18 onto the filler member 16, as well as with adherence to the filler member 16 after the thermoplastic particles 18 have been deposited. The heating 120 may be performed until the thermoplastic particles 18 are at least partially, if not completely, molten. Further, the heating 120 may be performed using any suitable method or device, such as by using a resistive wire and/or an induction heater to heat the thermoplastic particles 18. Those skilled in the art will appreciate that the specific temperature(s) required to achieve the at least partially molten state, as well as other processing conditions related to the heating 120 of the plurality of thermoplastic particles 18, are variable and mostly depends on the type thermoplastic material(s) 40 used. It is generally contemplated that these processing conditions may be varied as needed without departing from the scope of the present disclosure.

Figure 4:
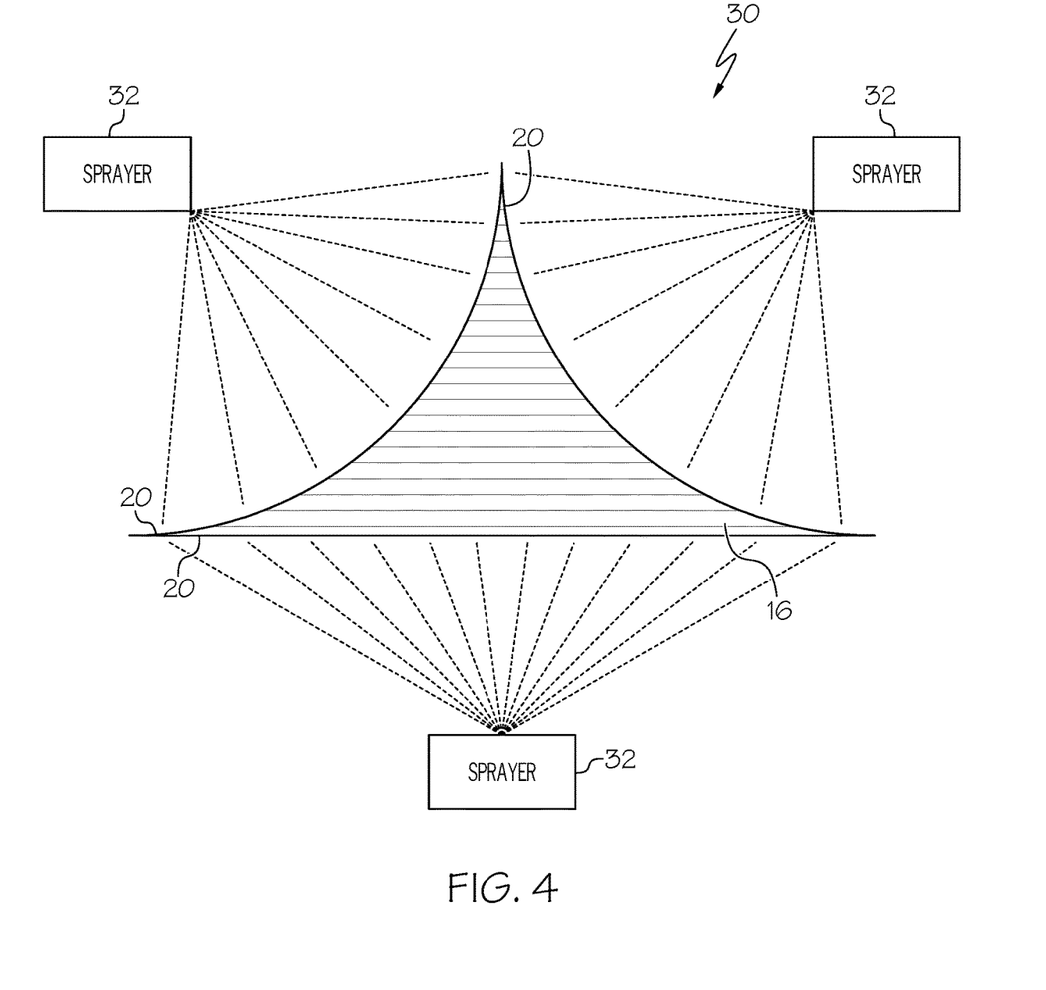
FIG. 4 is a front elevational view of the filler member of FIG. 3 as is passes through the coating station.

The method 100 includes depositing 130 a plurality of thermoplastic particles 18 onto a surface 20 of the filler member 16. As shown in FIG. 3A, this may be performed at a coating station 30, which may be a component of a larger composite structure manufacturing assembly or a stand-alone processing station. Referring to FIG. 4, the coating station 30 may include one or more sprayers 32 that are configured to spray the thermoplastic material 40 onto a surface 20 of the filler member 16, thereby yielding a plurality of thermoplastic particles 18 on that surface 20. As shown, the coating station 30 may include three sprayers 32 that spray a plurality of thermoplastic particles 18 onto all three sides of a relatively triangular (in cross-section) filler member 16. Those skilled in the art will appreciate, however, that varying numbers of sprayers 32 (e.g., either more or less than three) may be employed without departing from the scope of the present disclosure. Further, those skilled in the art will also appreciate that other methods of depositing 130 a plurality of thermoplastic particles 18, such as by extrusion, may be employed either instead of, or in addition to, spraying.

Although the present disclosure generally describes block 130 as being performed by depositing the plurality of thermoplastic particles 18 onto a filler member 16, it is also generally contemplated that, in one or more examples, the plurality of thermoplastic particles 18 may be deposited onto the structural member 22 either in addition to, or instead of, the filler member 16. Depositing 130 the plurality of thermoplastic particles 18 onto the structural member 22 may be preferred in instances where the structural member 22 is easier maneuver than the filler member 16.

In one example, block 120 may be performed after block 130. More specifically, it is generally contemplated that the method 100 may be performed by depositing 130 the plurality of thermoplastic particles 18 onto the filler member 16 and then heating 120 the plurality of thermoplastic particles 18. The heating 120 may be performed to facilitate adherence between the deposited thermoplastic particles 18 and the filler member 16. Those skilled in the art will appreciate, however, that performing block 120 after block 130 may not be preferred in instances where the filler member 16 is dry because dry thermoplastic particles 18 may simply fall off the dry filler 16 member after being deposited 130.

Figure 5:
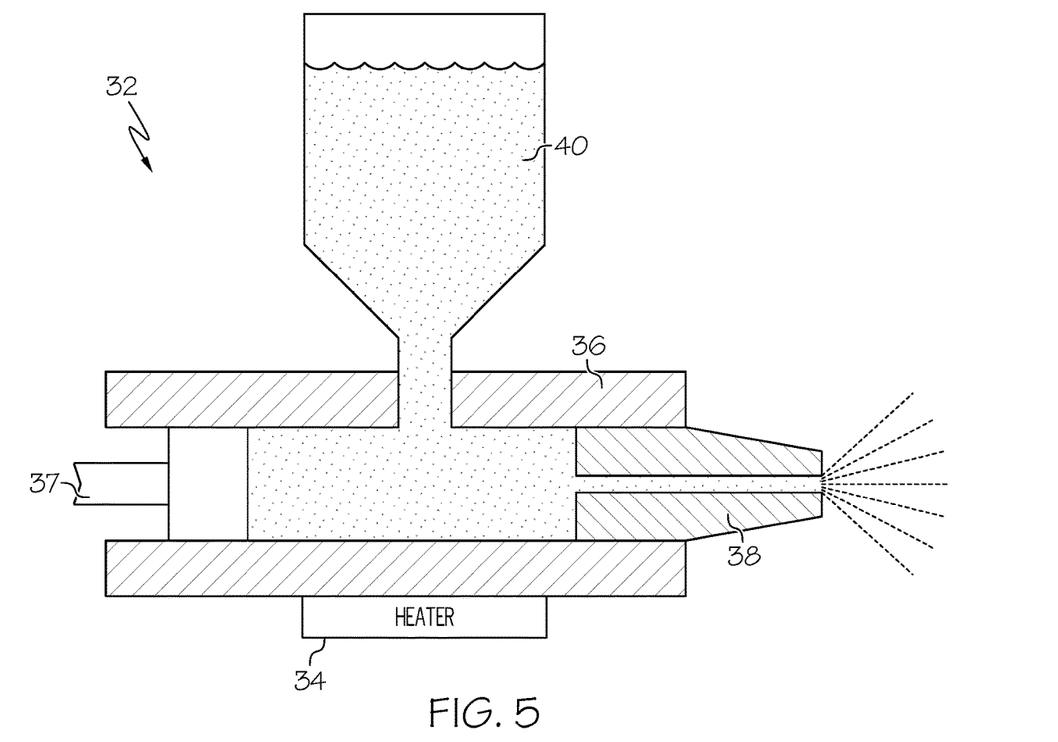
FIG. 5 is a cross-sectional view of an example sprayer that may be used in the coating station of FIG. 4.

Referring to FIG. 5, the present disclosure provides an example of a suitable sprayer. The sprayer(s) 32 may include a heater 34, a housing 36, a pressurizer 37 and a nozzle 38. The housing 36 may house a quantity of thermoplastic material 40, which may be heated by the heater 34 before being pressurized by the pressurizer 37 and sprayed out of the nozzle 38. Those skilled in the art will appreciate that thermoplastic particles 18 of a desired physical dimension may be achieved largely by selecting an appropriate nozzle 38. The pressure within the sprayer 32 may be varied as needed in accordance with the nozzle design 38. In one example, the nozzle 38 and the pressurizer 37 may be configured to spray (e.g., deposit) a single stream of thermoplastic particles 18. In another example, the nozzle 38 and the pressurizer 37 may be configured to atomize the thermoplastic material 40 as the thermoplastic material 40 leaves the nozzle 38, thereby yielding a plurality of thermoplastic particles 18. Thus, it is contemplated that blocks 110, 120 and 130 may be performed in relatively close succession, if not simultaneously.

In another example, the sprayer 32 may include a plurality of dry thermoplastic particles 18 and a propellant source (not shown), instead of a quantity of thermoplastic material 40 and a pressurizer 37. The propellant source may supply the sprayer 32 with a suitable propellant (many of which are well known in the art) that gathers dry thermoplastic particles 18 from the plurality of dry thermoplastic particles 18 and disperses the dry thermoplastic particles 18 onto the filler member 16. Those skilled in the art will appreciate that using dry thermoplastic particles 18, and the associated sprayer 32, may be preferred in applications involving filler members 18 that were fabricated from pre-impregnated composite materials. Since those filler members 18 already contain resin matrix 70 (and thus, are tacky), the dry thermoplastic particles 18 may adhere to the filler member 16 even without being molten. Accordingly, it is generally contemplated that the method 100 may be performed without blocks 110 and 120.

Depending on composition of the thermoplastic particles 18, in addition to the methods and processing conditions related to their deposition onto the filler member 16, the resulting plurality of thermoplastic particles 18 may vary in terms of size and areal density. In one example, the plurality of thermoplastic particles 18 may have an average particle size between about 1 micrometer and about 100 micrometers. In another example, the plurality of thermoplastic particles 18 may have an average particle size between about 10 micrometers and about 50 micrometers. In yet another example, the plurality of thermoplastic particles 18 may have an average particle size between about 23 micrometers and about 30 micrometers. Further, in a different example, the plurality of thermoplastic particles 18 may be deposited onto the surface at an areal density of about 1 $g/m^2$ to about 10 $g/m^2$. Those skilled in the art will appreciate that pluralities of thermoplastic particles 18 having other average particles sizes and areal densities may be employed without departing from the scope of the present disclosure.

The depositing 130 of a plurality of thermoplastic particles 18 may be performed such that a coating layer 26 is defined on the filler member 16. The coating layer 26 may be discontinuous across a portion of a surface 20 of the filler member 16, or across the entirety of it. Further, the depositing of the plurality of thermoplastic particles 18 may be controlled to yield a coating layer 26 having a desired coat thickness (t) (measured perpendicular to a surface 20 of the filler member 16). In one example, the plurality of thermoplastic particles 18 may be deposited to yield a coating layer 26 having a coating thickness (t) ranging from about 1 micrometer and about 100 micrometers. In another example, the plurality of thermoplastic particles 18 may be deposited to yield a coating layer 26 having a coating thickness (t) ranging from about 2 micrometer and about 80 micrometers. In yet another example, the plurality of thermoplastic particles 18 may be deposited to yield a coating layer 26 having a coating thickness (t) ranging from about 3 micrometer and about 60 micrometers.

After depositing 130 a plurality of thermoplastic particles 18 onto a surface 20 of a filler member 16, the method 100 may then proceed to block 140, assembling the filler member 16 with a structural member 12. Block 140 includes connecting the filler member 16 to the structural member 12, thereby defining an interface 22 therebetween. Further, the assembling 140 may be performed such that the plurality of thermoplastic particles 18 are disposed proximate the interface 22 between the filler member 16 and the structural member 12, thereby strengthening the interface 22.

Figure 6:
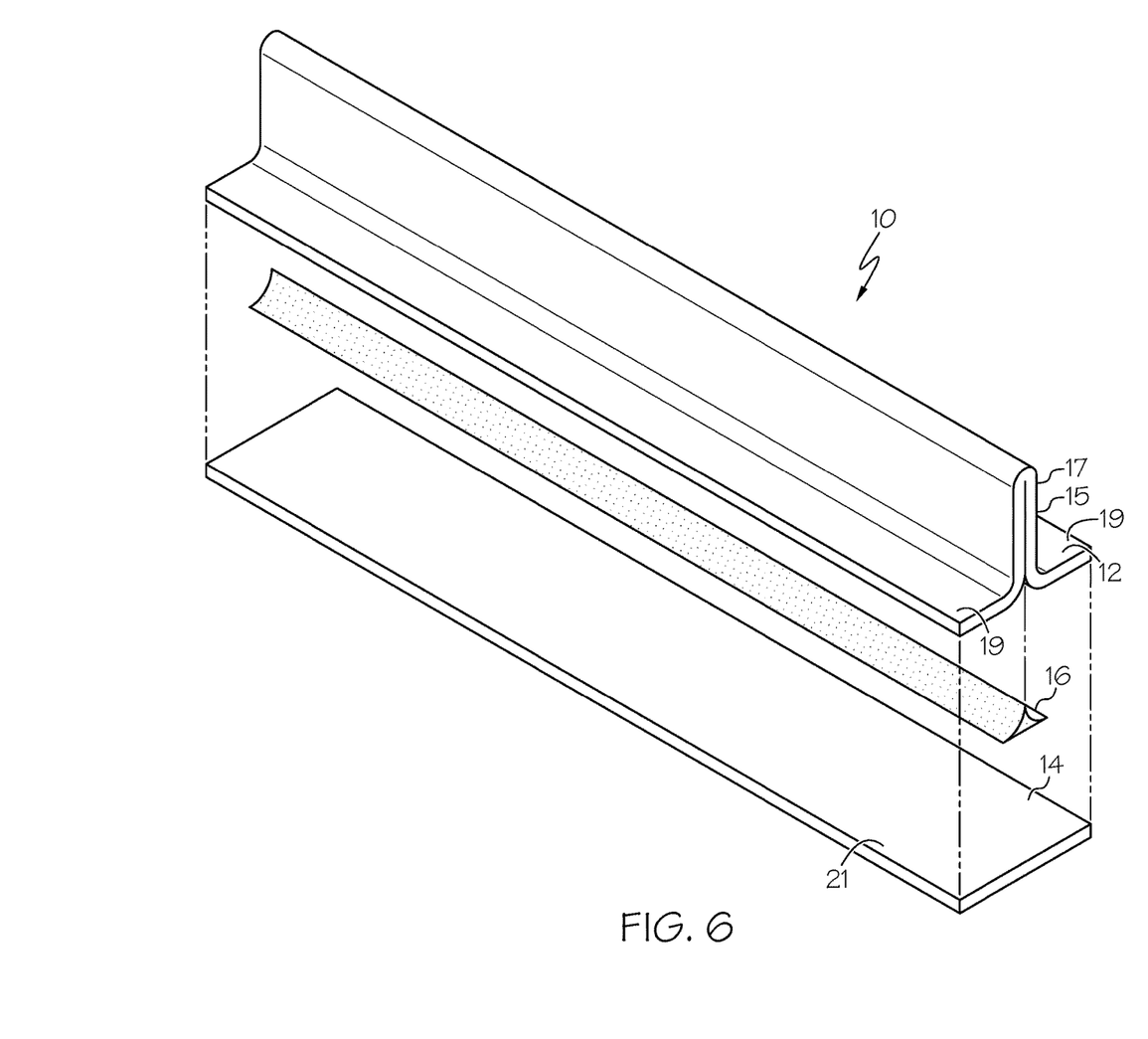
FIG. 6 is an exploded perspective view depicting the assembly of the composite structure of FIG. 1.

Referring to FIG. 6, the composite structure may include a first structural member 12 and a second structural member 14, with a void 28 defined therebetween. In this example, block 140 may be performed by simply positioning the filler member 16 within the void 28 and connecting the first structural member 12 to the second structural member 14 (e.g., sandwiching).

Figure 7:
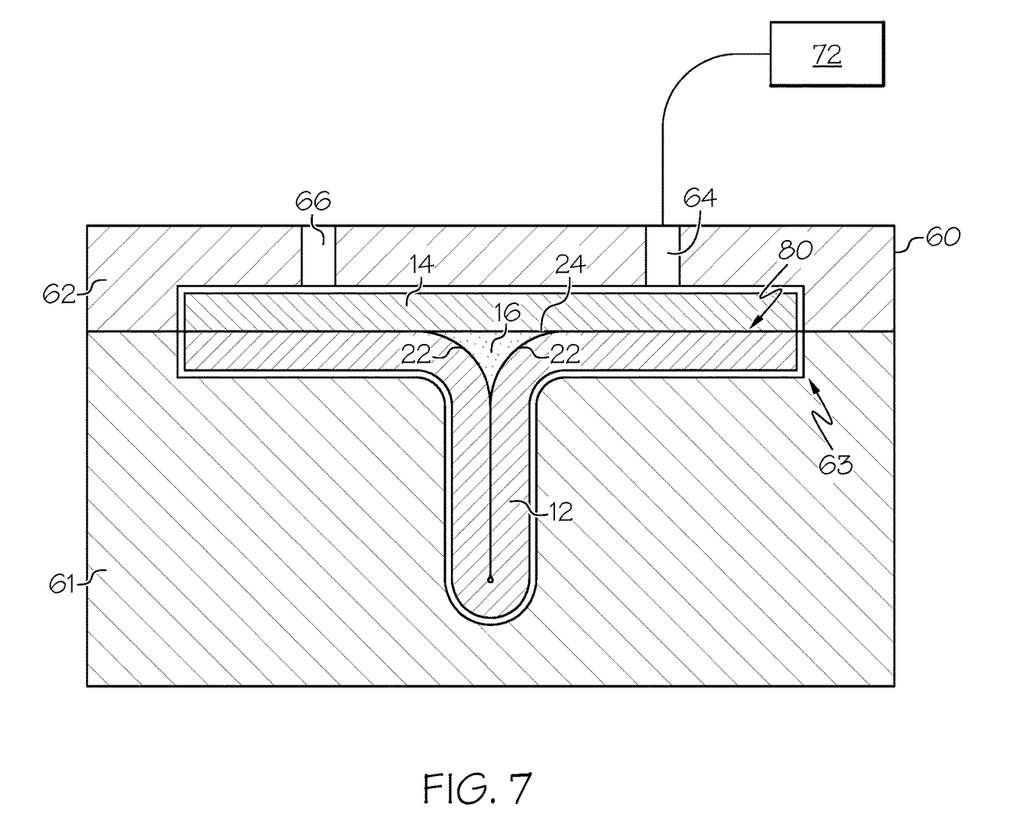
FIG. 7 is a front elevational view further depicting the assembly of the composite structure of FIG. 1.

Referring to FIG. 7, the assembling 140 of the first structural member 12, the second structural member 14 and the filler member 16 may be performed in a mold assembly 60 that includes a first mold 61 and a second mold 62. More specifically, the first mold 61 and the second mold 62 may define a mold cavity 63 therebetween that substantially corresponds to the desired shape of the finished composite structure 10. The first structural member 12, the second structural member 14 and the filler member 16 (and possibly other composite structure components) may be positioned within the mold cavity 63 and arranged into a preform 80. Once removed from the mold assembly 60, the resulting composite structure 10 will be near net shape (little if any finishing will be required).

The method 100 may further include infusing 150 the filler member 16 and the structural member 12 with a thermoset resin 72. Among other considerations, a suitable thermoset resin 72 may be selected based on the material compositions of the structural member 12, the filler member 16 and the plurality of thermoplastic particles 18. More specifically, it is generally contemplated that a suitable thermoset resin 72 should be able to infuse (e.g., penetrate) into the filler member 16 and the structural member 12 without dissolving/degrading the plurality of thermoplastic particles 18 (e.g., the thermoplastic particles will remain concentrated on the outer surface of the filler member). Further, those skilled in the art will appreciate that filler members 16 that include a coating layer 26 that is discontinuous may be better suited for thermoset resin 72 infusion than filler members 16 that include a coating layer 26 that is continuous because a coating layers 26 that is continuous may inhibit the flow of thermoset resin 72 into the filler member 16. One specific, non-limiting example of a suitable thermoset resin 72 may include epoxy resin.

If block 150 is performed within a mold assembly 60, in one or more examples, the mold assembly 60 may include an inlet 64 that provides access into the mold cavity 63 from the exterior of the mold assembly 60 (FIG. 7). This may be preferred in applications wherein at least one of the structural member 12 and the filler member 16 is "dry" because the inlet 64 would allow for the infusion of resin matrix 70 while the preform 80 is still in the mold assembly 60. In some examples, the mold assembly 60 may further include an outlet 66 for draining excess resin matrix 70 from the mold cavity 63 after infusion. Those skilled in the art will appreciate that various other devices/assemblies (e.g., such as a vacuum bag) may be employed to perform block 150 without departing from the scope of the present disclosure.

After infusing 150 the filler member 16 and the structural member 12 with thermoset resin 72, the method 100 may then proceed to block 160, curing the thermoset resin 72. Block 160 may be performed using any suitable curing method, many of which are well known in the art. In examples where the structural member 12 and the filler member 16 are both dry but later infused with thermoset resin 72, the later infused structural member 12 and filler member 16 may be co-cured. In examples where one of either the structural member 12 and the filler member 16 is at least partially cured while the other is uncured, the structural member 12 and the filler member may be co-bonded. Those skilled in the art will appreciate that various curing methods, devices and the like may be employed without departing from the scope of the present disclosure.

Figure 9:
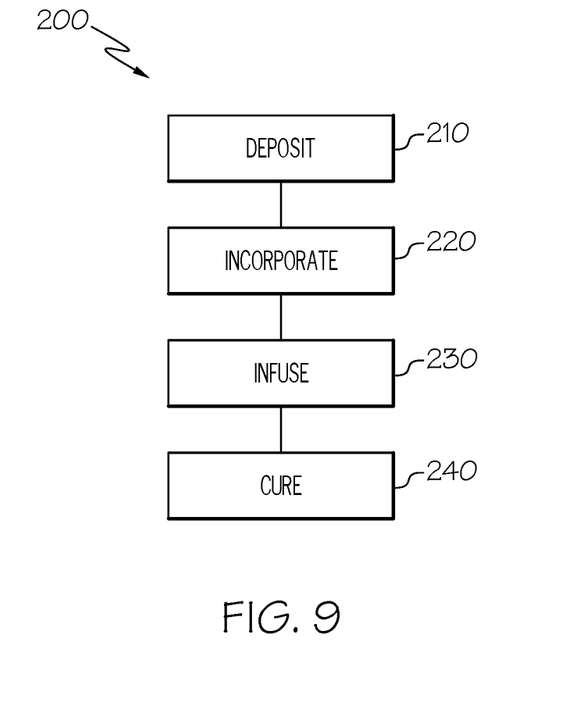
FIG. 9 is a flow diagram depicting one example of the disclosed method for toughening an interface between a filler member and a structural member.

Referring to FIG. 9, the present disclosure provides examples of a method 200 for toughening an interface 22 between a structural member 12 and a filler member 16. Toughening the interface 22 means that a greater amount of energy can be absorbed before a disbond or delamination occurs at the interface 22. The method 200 includes depositing (block 210) a plurality of thermoplastic particles 18 onto a surface 20 of the filler member 16 and incorporating (block 220) the filler member 16 into a preform 80 such that the plurality of thermoplastic particles 18 are disposed proximate the interface 22. The preform 80 includes the structural member 12 and the filler member 16. The method 200 further includes infusing (block 230) the preform with a thermoset resin 72 and curing (240) the thermoset resin 72.

Figure 10:
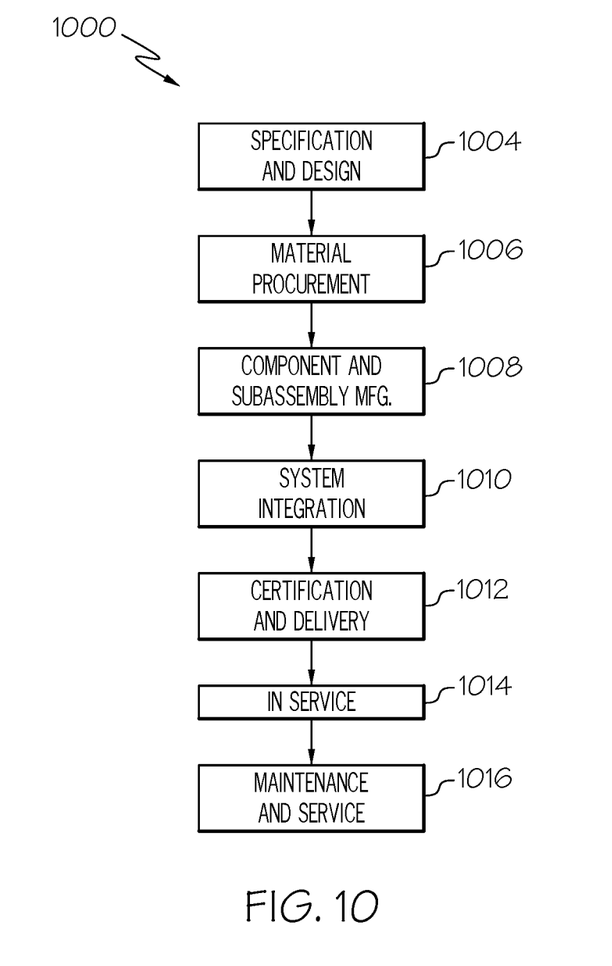
FIG. 10 is a flow diagram of an aircraft manufacturing and service methodology.
Figure 11:
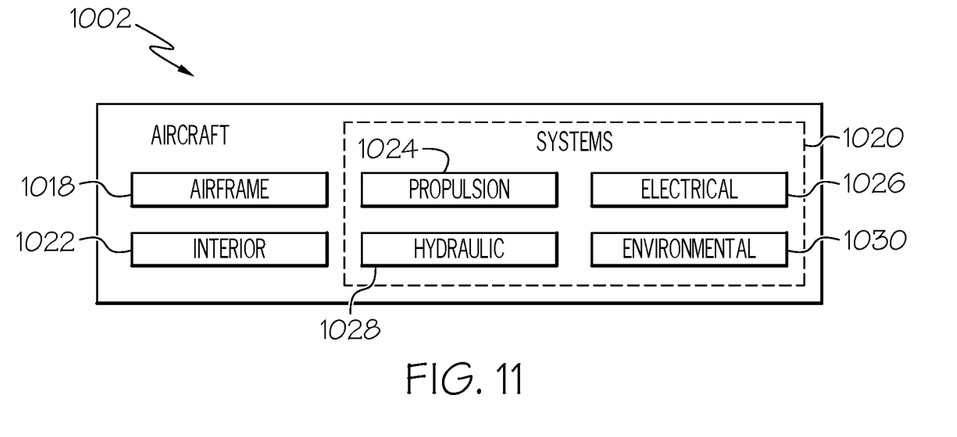
FIG. 11 is a block diagram of an aircraft.

Examples of the disclosure may be described in the context of an aircraft manufacturing and service method 1000, as shown in FIG. 10, and an aircraft 1002, as shown in FIG. 11. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed apparatus and methods for manufacturing a composite structure may be employed during any one or more of the stages of the aircraft manufacturing and service method 1000. As one example, the disclosed apparatus and methods for manufacturing a composite structure may be employed during material procurement 1006. As another example, components or subassemblies corresponding to component/subassembly manufacturing 1008, system integration 1010, and or maintenance and service 1016 may be fabricated or manufactured using the disclosed apparatus and methods for manufacturing a composite structure. As another example, the airframe 1018 and the interior 1022 may be constructed using the disclosed apparatus and methods for manufacturing a composite structure. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The disclosed apparatus and methods for manufacturing a composite structure are described in the context of an aircraft; however, one of ordinary skill in the art will readily recognize that the disclosed apparatus and methods for manufacturing a composite structure may be utilized for a variety of applications. For example, the disclosed apparatus and methods for manufacturing a composite structure may be implemented in various types of vehicles including, e.g., helicopters, passenger ships, automobiles and the like.

Although various examples of the disclosed composite structures and associated methods have been shown and described, modifications may occur to those skilled in the art upon reading the specification. The present application includes such modifications and is limited only by the scope of the claims.

What is claimed is:

1. A method for manufacturing a composite structure comprising a filler member and a structural member, said method comprising:
    depositing a plurality of thermoplastic particles onto at least one of a surface of a filler member and a surface of a structural member; and
    assembling said filler member with said structural member such that said plurality of thermoplastic particles are disposed proximate an interface between said filler member and said structural member.

2. The method of claim 1 wherein said depositing said plurality of thermoplastic particles comprises depositing said plurality of thermoplastic particles onto the surface of the filler member.

3. The method of claim 1 wherein said depositing said plurality of thermoplastic particles forms a discontinuous coating layer on said surface of said filler member.

4. The method of claim 3 wherein said discontinuous coating layer has a coating thickness ranging from about 1 micrometer and about 100 micrometers.

5. The method of claim 1 wherein said plurality of thermoplastic particles are deposited onto said surface at an areal density of about 1 $g/m^2$ to about 10 $g/m^2$.

6. The method of claim 1 wherein said depositing said plurality of thermoplastic particles comprises spraying.

7. The method of claim 1 further comprising heating such that said plurality of thermoplastic particles are at least partially molten immediately prior to said depositing said plurality of thermoplastic particles onto said surface.

8. The method of claim 1 further comprising heating such that said plurality of thermoplastic particles are at least partially molten immediately prior to said depositing said plurality of thermoplastic particles onto said surface, thereby improving adherence of the plurality of thermoplastic particles to said surface.

9. The method of claim 1 wherein said assembling is performed in a mold assembly.

10. The method of claim 1 further comprising, after said assembling, infusing a thermoset resin into said filler member and said structural member.

11. The method of claim 10 further comprising curing said thermoset resin.

12. The method of claim 1 wherein said filler member is pre-impregnated with a thermoset resin prior to said depositing said plurality of thermoplastic particles onto said surface.

13. The method of claim 1 wherein said plurality of thermoplastic particles have an average particle size between about 1 micrometer and about 100 micrometers.

14. The method of claim 1 further comprising atomizing a thermoplastic material to yield said plurality of thermoplastic particles.

15. The method of claim 14 wherein said thermoplastic material comprises a member selected from a group consisting of polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, polyethylene terephthalate, and combinations thereof.

16. A portion of an aircraft assembled according to the method of claim 1.

17. A method for toughening an interface between a filler member and a structural member, said method comprising:

depositing a plurality of thermoplastic particles onto a surface of said filler member;

incorporating said filler member into a preform comprising said structural member and said filler member such that said plurality of thermoplastic particles are disposed proximate said interface;

infusing said preform with a thermoset resin; and curing said thermoset resin.

18. The method of claim 3 wherein said discontinuous coating layer has a coating thickness ranging from about 5 micrometers and about 50 micrometers.

19. The method of claim 1 wherein said plurality of thermoplastic particles are deposited onto said surface at an areal density of about 2 $g/m^2$ to about 8 $g/m^2$.

20. The method of claim 1 wherein said plurality of thermoplastic particles have an average particle size between about 10 micrometers and about 50 micrometers.

21. The method of claim 1 wherein said plurality of thermoplastic particles have an average particle size between about 23 micrometers and about 30 micrometers.

* * * * *